US006722012B1

(12) United States Patent
Texeira et al.

(10) Patent No.: US 6,722,012 B1
(45) Date of Patent: Apr. 20, 2004

(54) MINTING PROCESS FOR PRODUCING A TWO COLOR COIN OR MEDAL

(75) Inventors: Antonio Jose do Rosario Coelho Texeira, Lisboa (PT); Paulo Antonio Martins, Parede (PT); Paulo Jorge Leitao, Carnaxide (PT)

(73) Assignee: Imprensa Nacional Casa da Moeda, SA, Lisbon (PT)

( * ) Notice: Subject to any disclaimer, the term of this patent is extended or adjusted under 35 U.S.C. 154(b) by 0 days.

(21) Appl. No.: 09/638,988

(22) Filed: Aug. 15, 2000

Related U.S. Application Data

(62) Division of application No. 09/011,360, filed as application No. PCT/PT97/00002 on Feb. 10, 1997, now abandoned.

(51) Int. Cl.[7] .................................................. B23P 11/00

(52) U.S. Cl. ........................................... 29/509; 40/27.5

(58) Field of Search ..................... 29/509, 17.4; 40/1.5, 40/27.5, 661.05, 675; 428/579, 600, 609; 63/23, 34

(56) References Cited

U.S. PATENT DOCUMENTS

| | | | |
|---|---|---|---|
| 29,652 A | 8/1860 | Maltby | |
| 31,871 A | 4/1861 | Copeley | |
| 3,607,147 A | 9/1971 | Harrison | |
| 3,636,616 A | 1/1972 | Remning | |
| 4,063,346 A | 12/1977 | Simpson et al. | |
| 4,435,911 A | 3/1984 | Jones | |
| 4,472,891 A | 9/1984 | Ielpo | |
| 4,973,524 A | 11/1990 | Huebner et al. | |
| 5,094,922 A | 3/1992 | Ielpo et al. | |
| 5,630,288 A | 5/1997 | Lasset et al. | |
| 6,514,374 B1 * | 2/2003 | Zurawski et al. | 40/27.5 |

FOREIGN PATENT DOCUMENTS

| | | |
|---|---|---|
| GB | 1276272 | 6/1972 |
| GB | 1483700 | 8/1977 |

* cited by examiner

*Primary Examiner*—Gregory Vidovich
*Assistant Examiner*—Jermie E. Cozart
(74) *Attorney, Agent, or Firm*—Brinks Hofer Gilson & Lione

(57) ABSTRACT

The invention deals with a technology for minting coins and medals. The technology is based on the utilization of metal blanks with similar diameters, one being very thin (hereafter named as the foil), joined together by mechanical means during the impartion of the surface details by the minting dies. The technology requires the design and manufacture of a special geometry in the edge of the thicker disk in order to make possible assembly of the metal blanks. The proposed technology is based on a multi-stage manufacturing process consisting of three cold metal forming operations (preforming, rimming and coining) and one intermediate annealing treatment. The first metal forming operation ensures the preforming of the thicker disk blank, hereafter named as the disk. The second metal forming stage is the rimming operation in which the preformed disk is bent along its diameter in order to generate a suitable profile for subsequent assembly with the foil. The third metal forming stage is a coining operation in which the metal blanks (disk and foil) are assembled together, by locking the foil into the rimmed edge of the disk, during the imprint of the surface details. The annealing treatment is to be performed before the coining operation. The goal is to restore the initial ductility of the disk prior to the final coining stage.

8 Claims, 3 Drawing Sheets

MINTING PROCESS FOR PRODUCING A TWO COLOR COIN OR MEDAL

This is a divisional application of Ser. No. 09/011,360, filed Jan. 29, 1998 now abandoned, which is a §371 application of PCT/PT97/00002 filed Feb. 10, 1997.

STATE-OF-THE-ART

So far, the technology used for producing bi-metallic (or bi-colored) coins, hereafter named bi-metallic ring technology, has consisted on the utilization of an inner disk (center) and an outside ring of different materials, generally with different colors.

The coins are produced in two stages: firstly the center is placed inside the outer ring with a little clearance, and secondly the two parts are assembled together with the impartion of the surface details by the minting dies (FIG. 1). In the last years, several technical solutions for ensuring the mechanical joint between the inner disk and outside ring, have been developed by the producers of disk blanks, manufacturers of presses as well as by the mint houses.

More recently, a new type of bi-metallic collection coin has been presented, in which the bi-colored effect is achieved by mounting a small foil over a limited zone of the surface of a disk blank.

DETAILED DESCRIPTION OF THE INVENTION

Figure 1:
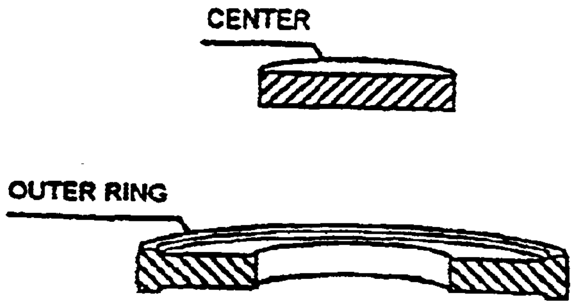
PRIOR ART FIGURE 1
FIG. 1 is an exploded sectional view of a two part prior art medal or coin.
Figure 2:
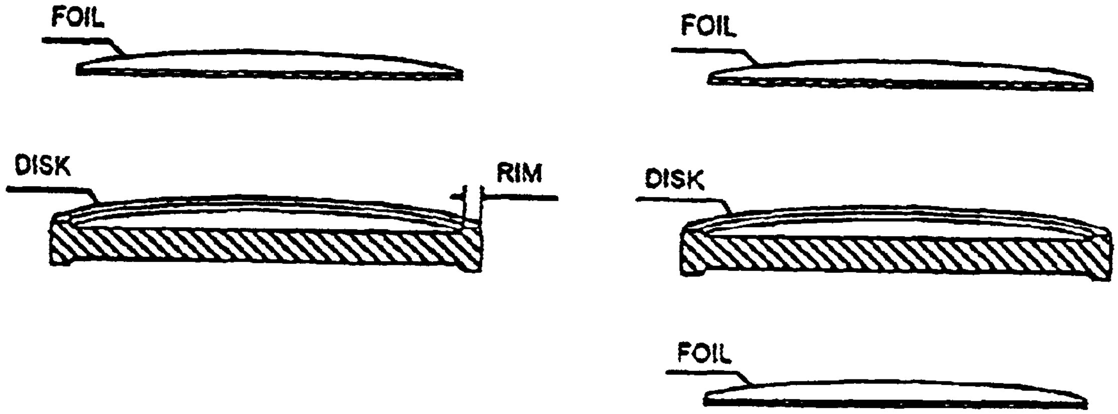
FIG. 2 is an exploded sectional view of two different blanks used in the formation of medals or coins of the present invention.

The invention, hereafter named as multi-metallic foil technology, is based on a concept entirely different to that of bi-metallic ring technology. Multi-metallic foil technology employs two or three disk blanks of different materials, having at least two different colors or shades. One (or two) of these blanks is very thin (hereafter named as foil), while the other is much thicker (hereafter named as disk) and has a larger diameter (FIG. 2).

The coins and medals are obtained by assembling the foil with the disk, by mechanical means, during the coining operation. Whenever two foils are to be utilized, these must be assembled in opposite sides of the disk.

The multi-metallic foil technology is based on a sequence of four different operations; three cold metal forming stages (preforming, rimming and coining) and one intermediate annealing treatment.

Figure 3:
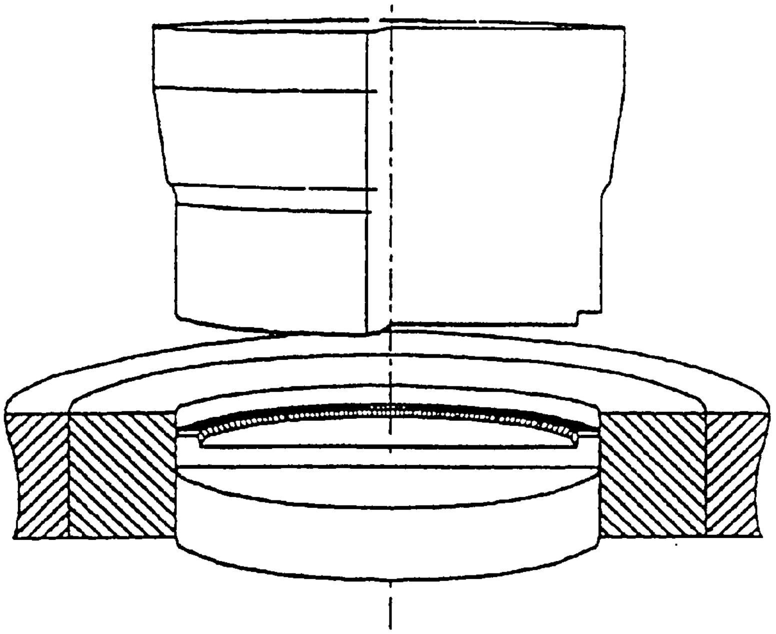
FIG. 3 is an exploded view, partially in section, of a die set performing the preforming step of the present invention on a medal or coin.

The metal forming sequence, starts with the preforming operation. This operation utilizes one flat die in conjunction with a special purpose die in order to produce an intermediate disk geometry having, in one of the sides, a considerably high distance from the table (lower floor surface of a coin with uniform level from which the volumes of the relieves grow) to the surface of the rim (FIG. 3). In other words, the preforming operation transforms the blank into an intermediate non-symmetrical disk having a near-flat surface in one of the sides and a high rim on the opposite side.

Figure 4:
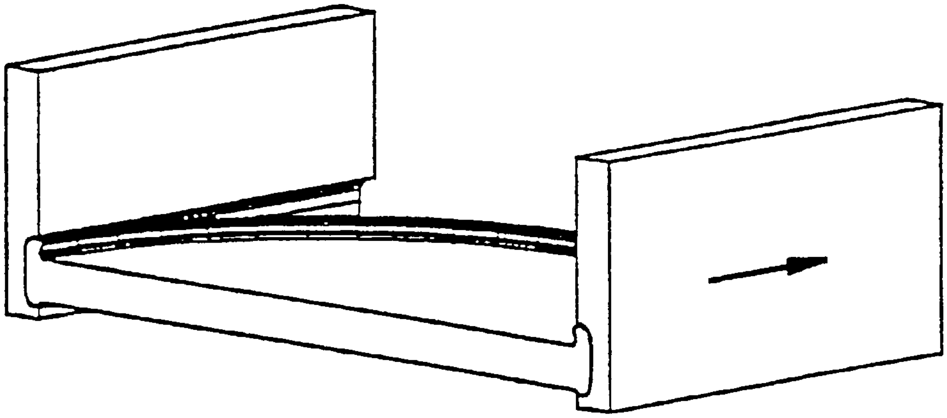
FIG. 4 is an exploded view, partially in section, of a rimming die set performing the rimming step of the present invention on a medal or coin.

The second metal forming stage is the rimming operation in which the preformed disk is bent along its diameter in order to generate a suitable profile for subsequent assembly with the foil (FIG. 4). Close dimensional tolerances are required as the final diameter reduction does not exceed approximately 1%. Sharp fillets at the rim to table corner are preferable to round corners with concave curvatures. The rimming operation is crucial for the overall success of the coining process.

The main design parameters utilized for a blank having an initial diameter equal to 33.65 mm are listed below:

$$X=0.8 \text{ mm}$$

$$Z=0.3 \text{ mm}$$

$$E=2.0 \text{ mm}$$

Figure 5:
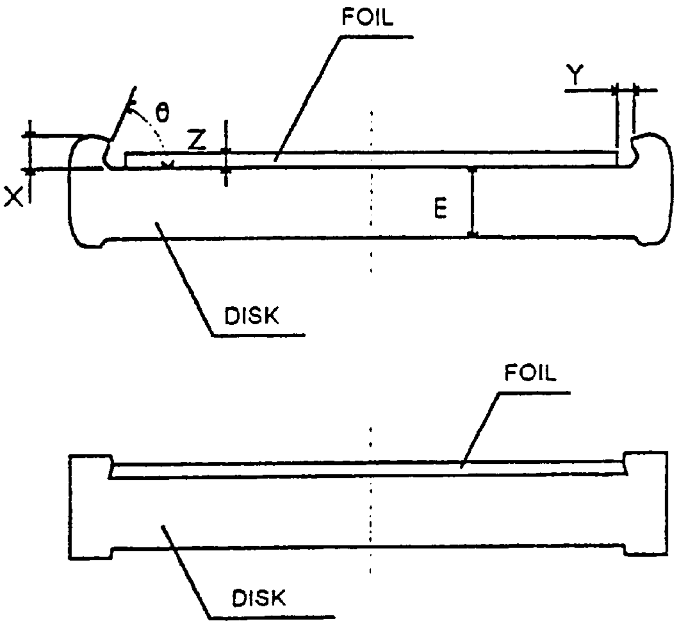
FIG. 5 is a sectional view of two medals or coins, one before and the other after the joining step of the present invention.

General guidelines for designing and manufacturing two- or three-colored coins are as follows (FIG. 5):

$$Z<X$$

$$Z<<E$$

$$45^{\circ}<\theta 90^{\circ}$$

Figure 6:
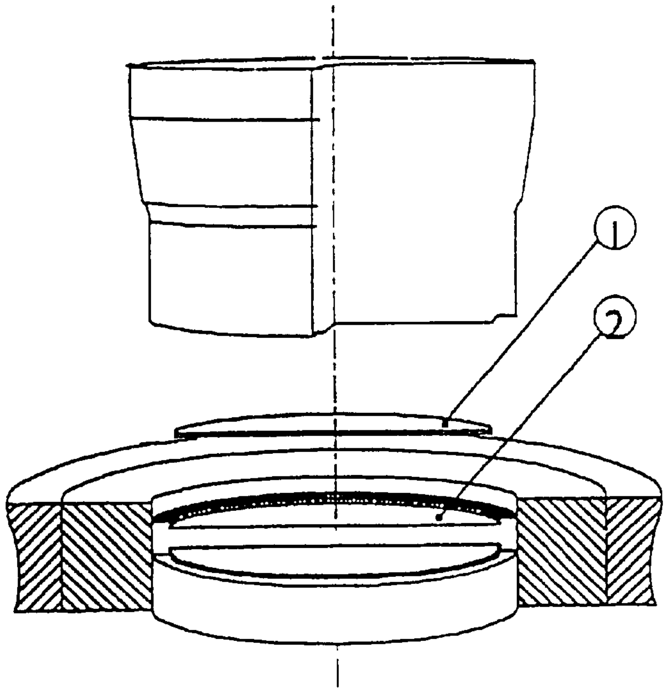
FIG. 6 is an exploded view, partially in section, of a die set performing the imprinting step of the present invention.

The third metal forming stage is the coining operation in which the two parts are assembled by locking the foil (1) into the rimmed edge of the disk (2), during the imprint of the surface details (FIG. 6). This operation requires the foil to be previously positioned on the surface of the disk. The clearance between the foil and the rimmed edge of the disk must be equal to Y=0.3 mm if a blank having an initial diameter equal to 33.65 mm is to be chosen. As a general rule, the clearance between the foil and the rimmed edge of the disk must be comprised within the range 1%–3% of the initial diameter of the blank.

Due to the level of strain accumulated during the preforming and rimming stages and due to the fact that the rims after being bent are preferential stress raiser zones, there might be a necessity of annealing the disk. The annealing softens the material, and therefore the initial ductility of the blank is completely recovered prior to the final coining stage.

The multi-metallic foil technology can be applied to all the metals and metal alloys currently utilized in the production of coins and medals. Proper selection of the metals to be used require the combination of technical and aesthetical criteria.

The multi-metallic foil technology is an alternative to conventional bi-metallic ring technology utilized worldwide, as well as to galvanized surface treatments that can also induce bi-color effects on a monometallic disk.

Multi-metallic foil technology allows the coining of gold-silver specimens with larger diameters and lower costs than those that would arise from the utilization of monometallic gold blanks. Therefore, it presents a unique opportunity for minting gold with large diameters without increasing the final cost of the product. As a consequent this technology opens new market opportunities for brilliant uncirculated coins and proof coins as well as for medals.

Finally, it must be emphasized that variations to this technology by employing three disks, two being very thin and one thicker placed in-between, are also possible. Non circular metal foils and/or disks can also be used in the minting process described herein.

What is claimed is:

1. A minting process for producing a two color coin or medal from a blank metal foil having a first color and a metal base having a thickness greater than the metal foil and a second color, the process comprising the steps of:

preforming the metal base to create an intermediate metal base geometry with a peripheral raised surface partition surrounding a lower surface area;

rimming the raised surface partition to form a suitable rim profile for subsequent assembly with the metal foil, annealing the metal base following the rimming step; and joining the blank metal foil onto the thicker metal base by:

positioning the blank metal foil proximate to the lower surface area, imprinting an image on the foil subsequent to the positioning step, and bending the rimmed profile for engagement with the foil.

2. The process of claim 1 wherein said metal foil has a thickness in the range of 0.1 mm to less than 0.3 mm.

3. The minting process of claim 1 wherein the imprinting and bending steps are performed simultaneously in a coining operation.

4. The minting process of claim 1 or 3 wherein the positioning step includes spacing a perimeter of the foil from the rim by a distance of about 0.3 mm.

5. The minting process of claim 1 or 3 wherein the positioning step includes spacing a perimeter of the foil from the rim by a distance within the range of 1% to 3% of the diameter of the blank metal foil.

6. The minting process of claim 1 or 3 wherein the rimming step includes forming a sharp fillet at the base of the rim.

7. The minting process of claim 1 or 3 wherein the annealing step is performed until the metal base recovers its initial ductility.

8. A minting process for producing a two color coin or medal from a blank metal foil having a first color and a known perimeter size, and a metal base having a second color, a known ductility and a thickness greater than the foil thickness, the process comprising the steps of:

preforming the metal base to create an intermediate metal base geometry with a peripheral raised surface partition surrounding a lower surface area;

rimming the raised surface partition to form a suitable rim profile, including a sharp fillet at the base of the rim, for subsequent assembly with the metal foil, annealing the metal base following the rimming step until the metal base recovers its initial ductility; and joining the blank metal foil onto the thicker metal base by:

positioning the blank metal foil proximate to the lower surface area of the metal base with the perimeter of the foil being spaced from the rim by a distance within the range of 1% to 3% of the diameter of the blank metal foil, and coining the foil and base simultaneously to imprint an image on the foil and to bend the rimmed profile for engagement with the foil.

* * * * *